(12) United States Patent
Ryskoski

(10) Patent No.: US 6,978,187 B1
(45) Date of Patent: Dec. 20, 2005

(54) METHOD AND APPARATUS FOR SCHEDULING PRODUCTION LOTS BASED ON LOT AND TOOL HEALTH METRICS

(75) Inventor: Matthew S. Ryskoski, Kyle, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 669 days.

(21) Appl. No.: 10/021,676

(22) Filed: Dec. 12, 2001

(51) Int. Cl.[7] .............................................. G06F 19/00
(52) U.S. Cl. .................................................... 700/100
(58) Field of Search ............................... 700/100, 108, 700/99, 106, 12

(56) References Cited

U.S. PATENT DOCUMENTS

| | | | |
|---|---|---|---|
| 5,444,632 A | 8/1995 | Kline et al. ................. | 364/468 |
| 5,940,787 A | 8/1999 | Gelston ...................... | 702/134 |
| 6,088,626 A * | 7/2000 | Lilly et al. .................. | 700/100 |
| 6,105,520 A * | 8/2000 | Frazer et al. ............... | 112/117 |
| 6,128,588 A | 10/2000 | Chacon ......................... | 703/6 |
| 6,260,427 B1 | 7/2001 | Jones et al. ................ | 73/865.9 |
| 6,415,196 B1 * | 7/2002 | Crampton et al. .......... | 700/100 |
| 6,456,894 B1 * | 9/2002 | Nulman ...................... | 700/100 |

FOREIGN PATENT DOCUMENTS

EP         1150187 A2    10/2001

OTHER PUBLICATIONS

International Search Report dated Sep. 23, 2003 (PCT/US02/34849; TT4500-PCT).
Preliminary Examination Report dated Mar. 16, 2004.

* cited by examiner

*Primary Examiner*—Albert W. Paladini
(74) *Attorney, Agent, or Firm*—Williams, Morgan & Amerson, P.C.

(57) ABSTRACT

A method for scheduling production flow includes processing a plurality of manufactured items in a process flow. Item health metrics are determined for at least a subset of the plurality of manufactured items. Tool health metrics are determined for a plurality of tools in the process flow. The manufactured items are scheduled for processing in the tools based on the item health metrics and the tool health metrics. A manufacturing system includes a plurality of tools for processing a plurality of manufactured items in a process flow, an item health monitor, a tool health monitor, and a scheduling server. The item health monitor is configured to determine item health metrics for at least a subset of the plurality of manufactured items. The tool health monitor is configured to determine tool health metrics for at least a subset of the plurality of tools. The scheduling server is configured to schedule the manufactured items for processing in the tools based on the item health metrics and the tool health metrics.

41 Claims, 2 Drawing Sheets

METHOD AND APPARATUS FOR SCHEDULING PRODUCTION LOTS BASED ON LOT AND TOOL HEALTH METRICS

BACKGROUND OF THE INVENTION

1. Field of the Invention

This invention relates generally to the field of semiconductor device manufacturing and, more particularly, to a method and apparatus for scheduling production lots based on lot and tool health metrics.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices. Pre-processing and/or post-processing metrology data is supplied to process controllers for the tools. Operating recipe parameters are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

In a typical semiconductor fabrication facility, wafers are processed in groups, referred to as lots. The wafers in a particular lot generally experience the same processing environment. In some tools, all of the wafers in a lot are processed simultaneously, while in other tools the wafers are processed individually, but under similar conditions (e.g., using the same operating recipe). Typically, a lot of wafers is assigned a priority in the beginning of its processing cycle. Priority may be assigned on the basis of the number of wafers in the lot or its status as a test or experimental lot, for example.

At a particular processing step, the relative assigned priorities of all the lots ready for processing are compared. Various rules are applied to determine which of the eligible lots is selected for processing. For example, for two lots with the same priority, the older of the lots is often selected for subsequent processing. In the case of a test lot of wafers (i.e., generally including a reduced number of wafers), the lot is subjected to one or more experimental processing steps or recipe adjustments in an attempt to improve the performance of the process or the performance of the resultant devices. Before commencing production of regular production lots using the experimental parameters, it is useful to first test the effectiveness of the changes based on the resulting characteristics of the wafers in the test lot. Hence, a test lot would be assigned a relatively high priority over other production lots, such that its processing is completed more quickly. Regardless of the particular priority assignments made, the rules are essentially static and predetermined. The priority of a particular lot does not typically change during its processing cycle, unless its status changes from being a production lot to a test lot, for example.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Devices are typically ranked by a grade measurement, which effectively determines its market value. In general, the higher a device is graded, the more valuable the device.

At a given process step, one or more processing tools may be available for performing the required processing. Although the various tools are capable of performing the same process on the lot, the tools may not be operating at the same level of proficiency (i.e., tool health). For example, one tool may be operating near the end of an interval between cleaning cycles. In some instances, when a tool is nearer the end of its cleaning interval the wafers processed in the tool may exhibit a higher particle contamination rate, as compared to a tool operating nearer the front end of its cleaning interval. A higher particle contamination rate can degrade the grade or yield of the wafers processed in the tool. Scheduling the lots through the processing line based on tool availability and lot priority may result in a lot having a high grade and yield being processed in a tool having a low tool health, resulting in a reduction in the grade or yield of the lot.

The present invention is directed to overcoming, or at least reducing the effects of, one or more of the problems set forth above.

SUMMARY OF THE INVENTION

One aspect of the present invention is seen in a method for scheduling production flow. The method includes processing a plurality of manufactured items in a process flow. Item health metrics are determined for at least a subset of the plurality of manufactured items. Tool health metrics are determined for a plurality of tools in the process flow. The manufactured items are scheduled for processing in the tools based on the item health metrics and the tool health metrics.

Another aspect of the present invention is seen in a manufacturing system including a plurality of tools for processing a plurality of manufactured items in a process flow, an item health monitor, a tool health monitor, and a scheduling server. The item health monitor is configured to determine item health metrics for at least a subset of the plurality of manufactured items. The tool health monitor is configured to determine tool health metrics for at least a subset of the plurality of tools. The scheduling server is configured to schedule the manufactured items for processing in the tools based on the item health metrics and the tool health metrics.

BRIEF DESCRIPTION OF THE DRAWINGS

The invention may be understood by reference to the following description taken in conjunction with the accompanying drawings, in which like reference numerals identify like elements, and in which.

Figure 1:
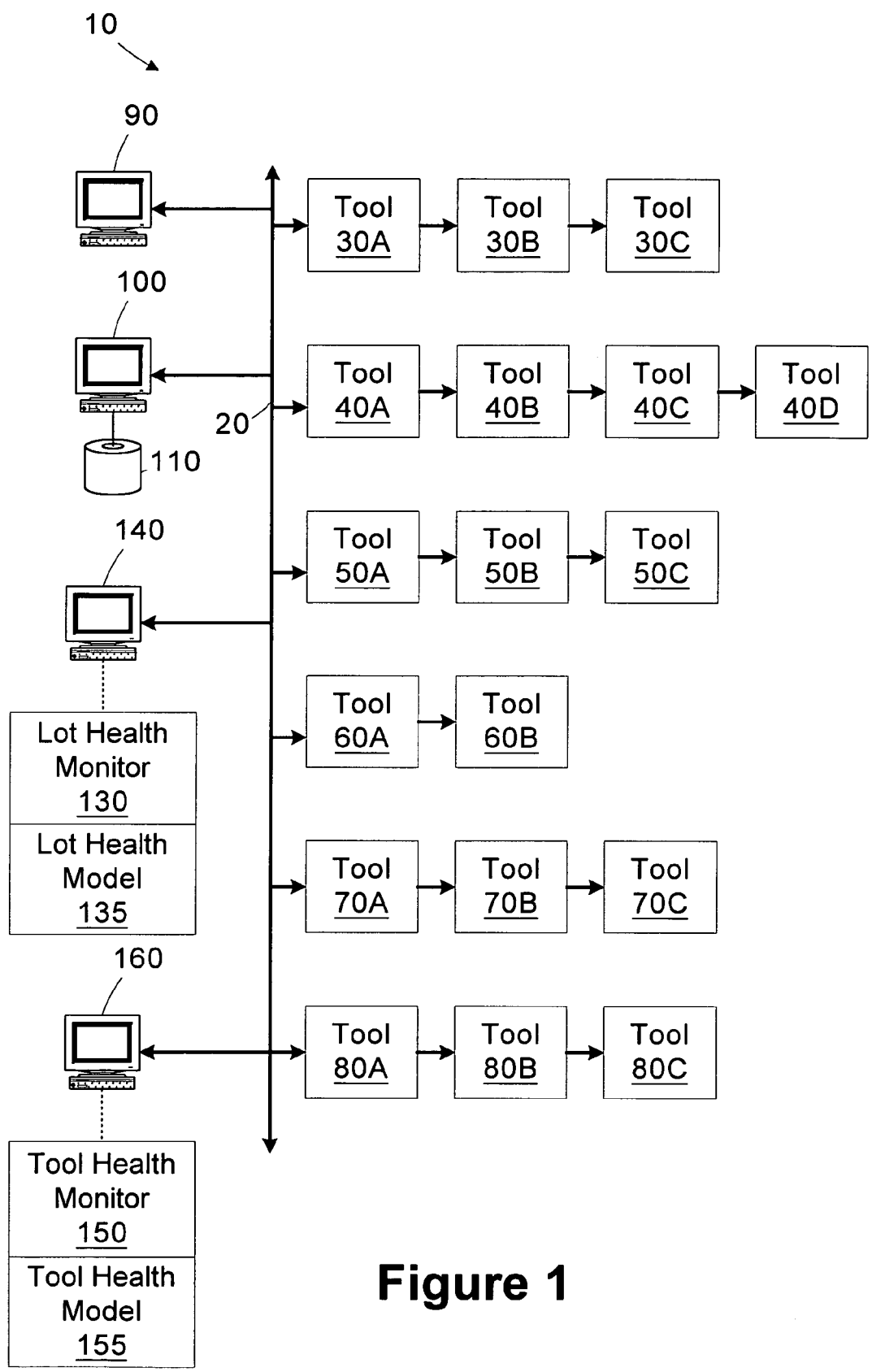
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of manufactured items including, but not limited to microprocessors, memory devices, digital signal processors, application specific integrated circuits (ASICs), or other similar devices. The techniques may also be applied to manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a photolithography stepper. A particular wafer or lot of wafers progresses through the tools 30–80 as it is being manufactured, with each tool 30–80 performing a specific function in the process flow. Exemplary processing tools for a semiconductor device fabrication environment, include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools may be arranged in any order of grouping. Additionally, the connections between the tools in a particular grouping are meant to represent only connections to the network 20, rather than interconnections between the tools. Although the invention is described as it may be implemented for scheduling lots of manufactured items, it may also be used schedule individual manufactured items.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. The MES server 90 may also be referred to as a scheduling server. A database server 100 is provided for storing data related to the status of the various entities and articles of manufacture in the process flow. The database server 100 may store information in one or more data stores 110. The data may include pre-process and post-process metrology data, tool states, lot priorities, etc. The manufacturing system 10 also includes a lot health monitor 130 executing on a workstation 140, and a tool health monitor 150 executing on a workstation 160. As described in greater detail below, the lot health monitor 130 generates lot health metrics for the lots being processed and stores them in the data store 110. The tool health monitor 150 generates tool health metrics for the tools 30–80 in the manufacturing system 10 and store them in the data store 110.

The MES server 90 accesses information in the data store 110 related to the estimated performance grade and/or yield of the lots under production (i.e., lot health metrics) and the health of the tools 30–80 (i.e., tool health metrics) to determine processing routes for the lots through the tools 30–80. The distribution of the processing and data storage functions amongst the different computers or workstations in FIG. 1 is generally conducted to provide independence and central information storage. Of course, different numbers of computers and different arrangements may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Various metrology information is collected during the fabrication of the lots. For example, physical measurements, such as transistor gate critical dimensions, particle contamination, process layer thickness, etc. may all be correlated by the lot health monitor 130 to a particular estimate of the performance grade and yield. Direct performance metrology measurements, such as wafer electrical tests (e.g., drive current, effective channel length, dielectric constant) may also provide information related to performance grade and yield. The particular metrology information used by the lot health monitor 130 to estimate grade as well as the nature of the graded variable may vary depending on the particular manufactured item being produced and the market for such items. For example, memory devices may be graded differently than microprocessors.

In the illustrated embodiment, the lot health monitor 130 generates a lot health metric based on estimated grade and yield, however, in other implementations, the lot health metric may be based on other quality metrics or other combinations thereof. For example, the lot health metric may be based only on yield.

The estimated grade and/or yield, broadly referred to as lot health, for a particular lot may change during its processing cycle. For example, deposition tools typically experience an increase in byproduct buildup between cleaning cycles. Hence, wafers processed immediately after the cleaning cycle is performed will have less particle contamination than wafers processed just prior to the performance of the cleaning cycle. If a particular lot passes through a deposition tool near the end of the time period between cleaning cycles, the particle contamination in the deposited process layer may be relatively high. This particle contamination may reduce the insulating properties of the process layer, thereby resulting in a reduction in the anticipated grade of the devices in the lot. The increased particle contamination may also result in a lower anticipated yield for the lot, e.g., by increasing the number of short circuits. On the other hand, if the lot of wafers is processed in a deposition tool just after the cleaning cycle is performed, its estimated lot health metric may increase. Similar effects on estimated lot health may result from the effects of processing in other tools.

Preprocess and post-process metrology information collected as a particular lot passes through the manufacturing system 10 may be used by the lot health monitor 130 to dynamically update the estimated lot health metric. At various steps in the process flow, the post-process metrology information may be correlated to an estimated lot health metric based on an empirical lot health model 135. The particular points in the process flow where the lot health metric is updated depend on the particular implementation. Exemplary lot health adjustment points include after the gate electrode has been formed (i.e., based on gate electrode physical dimensions), after formation of the first metal layer (i.e., based on drive current or effective channel length), after formation of the inter-level dielectric layer (i.e., based on measured dielectric constant), after formation of active source/drain regions (i.e., based on dimensions), after implant and thermal annealing (i.e., based on measured bulk resistivity, transistor threshold voltage, drive current, implant does and energy, implant anneal time and temperature), etc. The lot health model 135 may actually include a plurality of individual models for estimating lot health metrics based on information collected at the various estimation points.

Many different measurements, both physical and electrical, may be used by the lot health monitor 130 for determining lot health metrics. An exemplary, but not exhaustive, list of physical measurements includes a transistor gate critical dimension, a process layer thickness, a particle contamination count, and a transistor active region dimension. An exemplary, but not exhaustive, list of electrical measurements includes a transistor effective channel length, a drive current, an insulating layer dielectric constant, a transistor overlap capacitance, a regional material resistivity, a transistor threshold voltage, an n-channel to p-channel drive current ratio, an off-state transistor leakage current, and electrical charge carrier mobility measurement, and an oscillator test circuit frequency. Also, process parameters may also be used for estimating lot health metrics. An exemplary, but not exhaustive, list of process parameters includes implant dose and energy, and anneal temperature and time.

The tool health monitor 150 collects tool state trace data during processing runs of the monitored tool 30–80 to determine a tool health metric for the tool 30–80. One technique for monitoring the health of a particular tool 30–80 involves employing a multivariate tool health model 155 adapted to predict the expected operating parameters of the tool during the processing of wafers in the tool. If the actual tool parameters are close to the predicted tool parameters, the tool is said to have a high health metric (i.e., the tool is operating as expected). As the gap between the expected tool parameters and the actual tool parameters widens, the tool health metric decreases. If the tool health metric falls below a predetermined threshold, a maintenance procedure may be performed to troubleshoot or repair the tool. If the tool health metric is sufficiently low, the wafers processed by the tool in the degraded condition may be flagged as suspect or reworked.

Typically, the tool health model 155 used to predict the operating parameters of the tool 30–80, thereby measuring the health of the tool 30–80, is based on the particular tool 30–80 and the base operating recipe employed by the tool 30–80 for processing the wafers. Hence, each tool 30–80 may have a separate tool health model 155 for each of the base operating recipes run on the tool 30–80. An exemplary tool health monitor software application is ModelWare™ offered by Triant, Inc. of Nanaimo, British Columbia, Canada Vancouver, Canada. An exemplary system for monitoring tool health using multiple models for different processing situations is described in U.S. patent application Ser. No. 09/863,822, entitled "METHOD AND APPARATUS FOR MONITORING TOOL HEALTH," filed in the names of Elfido Coss Jr., Richard J. Markle, and Patrick M. Cowan, that is assigned to the assignee of the present application and incorporated herein by reference in its entirety.

When the MES server 90 seeks to schedule a particular lot for processing, it retrieves the lot health metric for the particular lot and the tool health metrics for the available tools 30–80 from the data store 110. The particular decision tree made by the MES server 90 in evaluating the lot health metrics and tool health metrics is implementation dependent. In one exemplary embodiment, only if the lot health metric is greater than a predetermined threshold (i.e., a presumably high value lot) does the MES server 90 retrieve the tool health metrics for the available tools 30–80 from the data store 110. The MES server 90 seeks to schedule the lot with a tool 30–80 having a relatively high tool health metric. For lots having lot health metrics below the threshold, standard scheduling techniques based on lot priority, age, and tool availability may be used.

A weighted system may also be used in lieu of a threshold. For example, lots requiring scheduling may receive a score based on factors such as their priority, age, and lot health. Of course, other factors or less factors may be used to score the lots (i.e., only the lot health metric may be used). The MES server 90 then schedules the lots based on their scores and the tool health metrics associated with the available tools 30–80. The lots with higher scores would be scheduled in the tools 30–80 with higher tool health metrics. Lots with high lot health metrics may also be grouped together in batches for processing in a tool 30–80 (e.g., a furnace) that accommodates processing more than one lot at a time.

In scheduling the lots, the MES server 90 may not always be able to schedule all lots with a high lot health metric in the tools 30–80 having the highest tool health metrics. The MES server 90 evaluates scheduling decisions to avoid creating a bottleneck situation, where all the lots with high lot health metrics seek to be processed by the best performing tool 30–80. The weighted system described above can be used to reduce the potential for bottlenecks. For example, if two lots have a similar lot health metric, the lot with the higher priority will be scheduled in the better performing tool 30–80. In another example, if two lots have a similar lot health metrics, but one of the lots has a higher estimated grade, it may receive priority to maintain its yield of more valuable devices.

Figure 2:
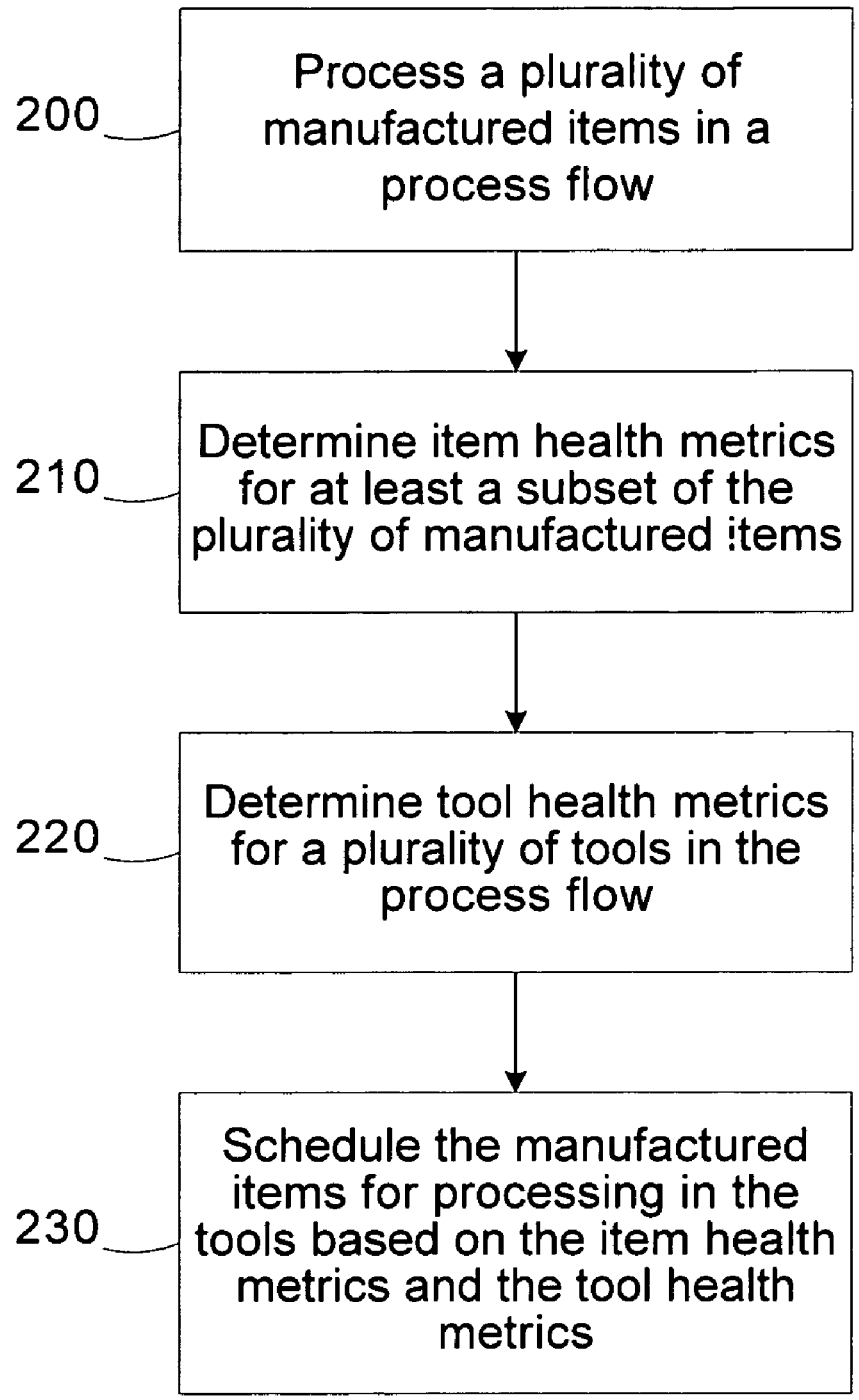
FIG. 2 is simplified flow diagram of a method for scheduling production lots based on lot and tool health in accordance with another illustrative embodiment of the present invention is provided.

Turning now to FIG. 2, a simplified flow diagram of a method for scheduling production lots based on lot and tool health in accordance with another illustrative embodiment of the present invention is provided. In block 200, a plurality of manufactured items, such as semiconductor wafers, are processed in a process flow including a plurality of tools 30–80. In block 210, item health metrics are determined for at least a subset of the plurality of manufactured items. The item health metrics may be determined based on factors such as grade and yield. In block 220, tool health metrics are determined for at least a subset of the plurality of tools. In block 230, the manufactured items are scheduled for processing in the tools based on the item health metrics and the tool health metrics.

Determining lot health metrics, as described above, for the semiconductor devices being fabricated and scheduling the flow of the devices through the manufacturing system 10 based on the tool health metrics of the tools 30–80 has numerous advantages. The value of lots having a high lot health can be maintained during subsequent processing. By identifying high value lots and seeking to protect their value by processing them in high performing tools, the quality of the manufactured devices and, thus, the profitability of the manufacturing system 10 can be increased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for scheduling production flow, comprising:
   processing a plurality of manufactured items in a process flow;
   determining item health metrics for at least a subset of the plurality of manufactured items;
   determining tool health metrics for a plurality of tools in the process flow; and
   scheduling the manufactured items for processing in the tools based on the item health metrics and the tool health metrics.

2. The method of claim 1, wherein determining the item health metrics further comprises:
   measuring characteristics of a plurality of manufactured items in the process flow;
   estimating the item health metrics for the plurality of manufactured items based on the measured characteristics.

3. The method of claim 2, wherein estimating the item health metrics further comprises estimating at least one of a grade parameter and a yield parameter.

4. The method of claim 2, wherein measuring the characteristics comprises measuring a physical characteristic of the manufactured items.

5. The method of claim 4, wherein the manufactured items comprise semiconductor devices, and measuring the physical characteristic comprises measuring at least one of a transistor gate critical dimension, a process layer thickness, a particle contamination count, and a transistor active region dimension.

6. The method of claim 2, wherein measuring the characteristics comprises measuring at least one of an implant dose and energy, and an anneal temperature and time.

7. The method of claim 2, wherein measuring the characteristics comprises measuring an electrical characteristic of the manufactured items.

8. The method of claim 7, wherein the manufactured items comprise semiconductor devices, and measuring the electrical characteristic comprises measuring at least one of a transistor effective channel length, a drive current, an insulating layer dielectric constant, a transistor overlap capacitance, a regional material resistivity, a transistor threshold voltage, an n-channel to p-channel drive current ratio, an off-state transistor leakage current, and electrical charge carrier mobility measurement, and an oscillator test circuit frequency.

9. The method of claim 2, further comprising periodically measuring the characteristics of the manufactured items and updating the item health metrics as the manufactured items progress through the process flow.

10. The method of claim 1, wherein processing the plurality of manufactured items comprises processing at least one of a plurality of microprocessors, a plurality of memory devices, a plurality of digital signal processors, and a plurality of application specific integrated circuits.

11. The method of claim 1, wherein the plurality of manufactured items are grouped into lots, and the determining the item health metric further comprises determining a lot health metric.

12. The method of claim 11, wherein scheduling the manufactured items for processing in the tools further comprises grouping lots with similar lot health metrics for processing in a selected tool.

13. The method of claim 1, wherein scheduling the manufactured items for processing in the tools further comprises grouping items with similar item health metrics for processing in a selected tool.

14. The method of claim 1, wherein determining the tool health metrics further comprises:
generating a tool state trace related to the processing of a selected manufactured item in a selected tool; comparing the tool state trace to a tool health model associated with the selected tool; and
generating the tool health metric based on the comparison between the tool state trace and the tool health model.

15. The method of claim 14, wherein generating the tool state trace further comprises measuring a parameter of the selected tool during the processing of the selected manufactured item.

16. The method of claim 15, wherein comparing the tool state trace to the tool health model further comprises predicting a parameter of the tool during the processing of the selected manufactured item and comparing the measured parameter to the predicted parameter.

17. The method of claim 1, wherein scheduling the manufactured items for processing in the tools further comprises:
comparing the item health metric associated with a selected manufactured item to a predetermined threshold;
determining a high performing tool based on the tool health metrics; and
scheduling the selected manufactured item in the high performing tool responsive to the item health metric exceeding the predetermine threshold.

18. The method of claim 1, wherein scheduling the manufactured items for processing in the tools further comprises:
ranking the tools in order of performance based on the tool health metrics;
ranking the manufactured items in order of health based on the item health metrics; and
scheduling the manufactured items in the tools based on the performance rankings and the health rankings.

19. The method of claim 18, wherein scheduling the manufactured items further comprises giving preference to the manufactured items with relatively higher item health metrics to tools with relatively higher tool health metrics.

20. The method of claim 18, wherein ranking the manufactured items further comprises ranking each manufactured item based on its item health metric and at least one of a priority associated with the manufactured item and an age associated with the manufactured item.

21. A manufacturing system, comprising:
a plurality of tools for processing a plurality of manufactured items in a process flow;
an item health monitor configured to determine item health metrics for at least a subset of the plurality of manufactured items;
a tool health monitor configured to determine tool health metrics for at least a subset of the plurality of tools; and
a scheduling server configured to schedule the manufactured items for processing in the tools based on the item health metrics and the tool health metrics.

22. The system of claim 21, wherein the item health monitor is further configured to access measurements of a characteristic of a plurality of manufactured items in the process flow and estimate the item health metrics for the plurality of manufactured items based on the measurements.

23. The system of claim 22, wherein the item health monitor is further configured to determine the item health metrics based on at least one of a grade parameter and a yield parameter.

24. The system of claim 22, wherein the characteristic further comprises a physical characteristic of the manufactured items.

25. The system of claim 24, wherein the manufactured items comprise semiconductor devices, and the physical characteristic comprises at least one of a transistor gate critical dimension, a process layer thickness, a particle contamination count, and a transistor active region dimension.

26. The system of claim 22, wherein the characteristic comprises at least one of an implant dose and energy, and an anneal temperature and time.

27. The system of claim 22, wherein the characteristic comprises an electrical characteristic of the manufactured items.

28. The system of claim 27, wherein the manufactured items comprise semiconductor devices, and the electrical characteristic comprises at least one of a transistor effective channel length, a drive current, an insulating layer dielectric constant, a transistor overlap capacitance, a regional material resistivity, a transistor threshold voltage, an n-channel to p-channel drive current ratio, an off-state transistor leakage current, and electrical charge carrier mobility measurement, and an oscillator test circuit frequency.

29. The system of claim 22, wherein the item health monitor is further configured to periodically access measurements of the characteristics of the manufactured items and update the item health metrics as the manufactured items progress through the process flow.

30. The system of claim 21, wherein the plurality of manufactured items comprise at least one of a plurality of microprocessors, a plurality of memory devices, a plurality of digital signal processors, and a plurality of application specific integrated circuits.

31. The system of claim 21, wherein the plurality of manufactured items are grouped into lots, and the item health metric further comprises a lot health metric.

32. The system of claim 31, wherein the scheduling server is further configured to group lots with similar lot health metrics for processing in a selected tool.

33. The system of claim 21, wherein the scheduling server is further configured to group items with similar item health metrics for processing in a selected tool.

34. The system of claim 21, wherein the tool health monitor is further configured to access a tool state trace related to the processing of a selected manufactured item in a selected tool, compare the tool state trace to a tool health model associated with the selected tool, and generate the tool health metric based on the comparison between the tool state trace and the tool health model.

35. The system of claim 34, wherein the tool state trace further comprises a parameter of the selected tool measured during the processing of the selected manufactured item.

36. The system of claim 35, the tool health monitor is further configured to predict a parameter of the tool during the processing of the selected manufactured item and compare the measured parameter to the predicted parameter.

37. The system of claim 21, wherein the scheduling server if further configured to compare the item health metric associated with a selected manufactured item to a predetermined threshold, determine a high performing tool based on the tool health metrics, and schedule the selected manufactured item in the high performing tool responsive to the item health metric exceeding the predetermine threshold.

38. The system of claim 21, wherein the scheduling server is further configured to rank the tools in order of performance based on the too) health metrics, rank the manufactured items in order of health based on the item health metrics, and schedule the manufactured items in the tools based on the performance rankings and the health rankings.

39. The system of claim 38, wherein the scheduling server is further configured to give preference to the manufactured items with relatively higher item health metrics to tools with relatively higher tool health metrics.

40. The method of claim 38, wherein the scheduling server is further configured to rank each manufactured item based on its item health metric and at least one of a priority associated with the manufactured item and an age associated with the manufactured item.

41. A manufacturing system, comprising:

means for processing a plurality of manufactured items in a process flow;

means for determining item health metrics for at least a subset of the plurality of manufactured items;

means for determining tool health metrics for a plurality of tools in the process flow; and means for scheduling the manufactured items for processing in the tools based on the item health metrics and the tool health metrics.

* * * * *